United States Patent [19]

Cloyd et al.

[11] Patent Number: 5,009,927
[45] Date of Patent: Apr. 23, 1991

[54] METHOD FOR COATING FABRIC SURFACE WITH ELECTRICALLY CONDUCTIVE FILM

[75] Inventors: Willard C. Cloyd, Fountain Hills; Robert M. Nelson, Phoenix, both of Ariz.

[73] Assignee: Hexcel Corporation, Dublin, Calif.

[21] Appl. No.: 277,105

[22] Filed: Nov. 29, 1988

[51] Int. Cl.⁵ .................. B05D 5/12; B05D 3/00; C23C 14/34
[52] U.S. Cl. .................. 427/121; 204/192.14; 204/192.15; 427/124; 427/125; 427/250; 427/296; 427/404; 427/407.1; 427/407.3; 427/434.2
[58] Field of Search .................. 427/58, 121, 124, 125, 427/250, 296, 383.1, 389.9, 393.5, 389.8, 407.3, 404, 430.1, 434.2, 434.6, 412; 204/192.14, 192.15

[56] References Cited

U.S. PATENT DOCUMENTS

| | | | |
|---|---|---|---|
| 4,234,648 | 11/1980 | Patz et al. | 428/245 |
| 4,308,314 | 12/1981 | Nakano et al. | 427/121 |
| 4,330,811 | 5/1982 | Bordner | 361/212 |
| 4,345,005 | 8/1982 | All et al. | 427/407.3 |
| 4,571,279 | 2/1986 | Oizumi et al. | 427/407.3 |
| 4,597,996 | 7/1986 | Chellis | 427/407.3 |
| 4,606,937 | 8/1986 | Rossler et al. | 427/121 |
| 4,711,816 | 12/1987 | Withnebel | 427/121 |
| 4,727,383 | 2/1988 | Hill | 427/121 |
| 4,806,185 | 2/1989 | Porter et al. | 427/407.3 |

FOREIGN PATENT DOCUMENTS 338407 3/1977 U.S.S.R.

OTHER PUBLICATIONS

Processing, a Second Spring for Metalloplastics, from Plastics Engineering, Dec. 1978.

*Primary Examiner*—Sadie Childs
*Attorney, Agent, or Firm*—Townsend and Townsend

[57] ABSTRACT

A thin film of an electrically conductive material (16) is applied to form an electrically conductive surface (22) on a surface (18) of a polymer coated fabric (14). The method involves coating a woven glass fiber fabric (14) with a polymer solution (6), curing the polymer solution on the glass fiber fabric and then depositing the electrically conductive material onto the cured polymer surface, typically by a sputtering technique, to form a flexible, electrically conductive fabric (24). This method helps to ensure that when the electrically conductive material is applied, the electrically conductive surface formed is continuous and is of a controlled, generally constant, thickness. The substantial continuity of the electrically conductive surface is maintained even when the electrically conductive fabric is flexed during subsequent manufacturing operations.

5 Claims, 1 Drawing Sheet

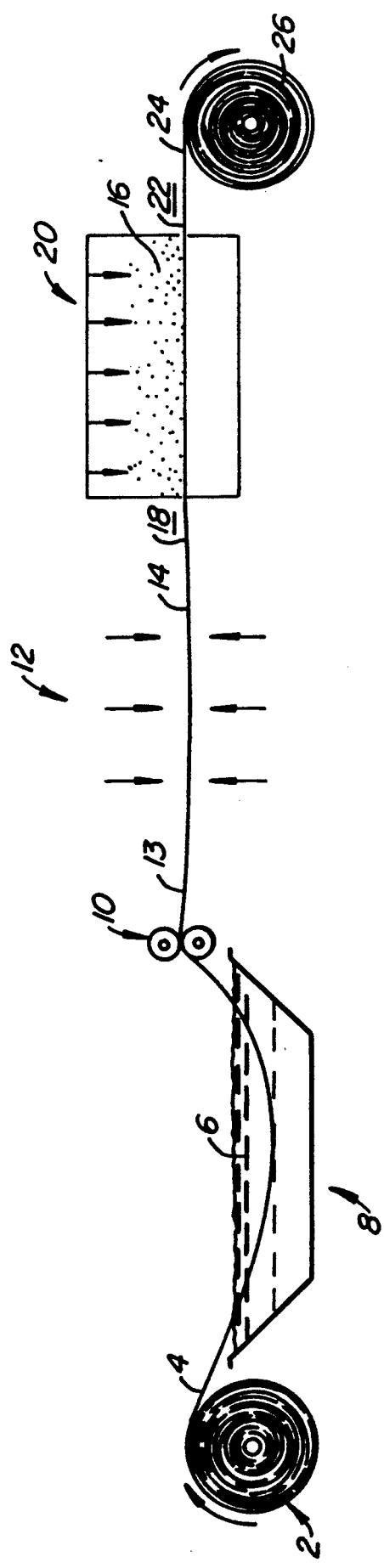
FIGURE

METHOD FOR COATING FABRIC SURFACE WITH ELECTRICALLY CONDUCTIVE FILM

BACKGROUND OF THE INVENTION

As a rocket, missile, aircraft or another airborne craft moves through the air, electrical charges build up on the outer surface of the body. There are also times when the surface of the airborne craft is subjected to high energy electrical discharge, such as when it flies through an electrical storm or is struck by lightning. When the skin is of metal, typically aluminum, charge dispersal is not a problem. However, airborne craft have increasingly been made using composite materials instead of aluminum to form their outer surface or skin. Composites, which often incorporate fibrous materials in their composition, exhibit high strength to weight ratios but do not normally have the ability to dissipate electrical charges effectively.

To remedy this problem it is necessary to modify the composite structure in a manner which allows for dissipation of electrical energy buildup. One way of doing so is to apply an electrically conductive material directly to one of the fibrous mats or fabrics to be used to make the composite material, thus forming a thin metallic film on the fibers to disperse or dissipate electrical energy. The fibrous mat or fabric to which the electrically conductive material has been applied is used to form the outer surface of the composite structure. The effectiveness of the electrically conductive film is increased if it is continuous and of constant thickness throughout. However, producing a continuous, constant thickness electrically conductive film on flexible fibrous mats or fabrics has proven difficult because of the tendency to break the metallic bonds between adjacent fibers when the fibrous mat or fabric is flexed during subsequent manufacturing operations.

Another method used to create a composite structure with an electrically conductive outer surface is to deposit an electrically conductive material directly onto the outer surface of the composite structure. Although an electrically conductive film is formed, it is frequently discontinuous in places where the electrically conductive material does not adhere to the composite surface; this usually occurs due to a mismatch of adhesion characteristics between the metal and composite polymer surface. Also, where the electrically conductive material adheres, the thickness of the electrically conductive layer tends to vary greatly over the entire surface.

A further method for creating an electrically conductive surface on a composite structure is through the application of a coated polymer film, such as that sold under the trademark Kapton by E. I. DuPont de Nemours & Co., of Wilmington, Delaware. The polymer film has its outer surface coated with a layer of an electrically conductive material to form an electrically conductive film of a desired thickness. The coated film is then bonded to the surface of the composite structure. However, in some environments and with some composite structures, the polymer layer exhibits poor adhesion characteristics allowing the electrically conductive film to peel away from the composite structure. This may be due in part to differences in the coefficients of thermal expansion between the polymer film and the materials from which the composite structures are made.

SUMMARY OF THE INVENTION

The present invention is directed to solving the problems associated with applying a continuous, controlled thickness layer or film of electrically conductive material to the outer surface of a flexible fabric, the fabric of the type having a fibrous outer surface. The invention employs a series of steps to reach the desired result. First, the fabric, typically a woven glass fiber fabric, is coated with a polymer solution. The polymer solution not only coats the fibers but also fills in any voids or holes between the fibers. The polymer solution is then cured to create a polymerized resin covering the fabric. This creates a continuous surface onto which the conductive material can be properly applied. Then the electrically conductive material is applied to the surface of the coated fabric to create a flexible, electrically conductive fabric. When the electrically conductive material is applied it adheres to the continuous polymer layer at a controlled (typically uniform) thickness across the surface.

Covering the entire fabric surface with the polymer solution and curing it creates a continuous polymer surface on which the electrically conductive material can be properly applied. The polymer surface base, on which the electrically conductive material is applied, reduces the electrical discontinuities which would otherwise be created at the joints between adjacent fibers when the material is flexed during subsequent manufacturing operations. Although the fabric does lose some of its draping qualities after being polymer coated, cured and coated with a conductive layer, the conductive fabric remains sufficiently flexible for use as a layer in conventional composites. The conductive fabric can also be used with adhesives for bonding to a surface using conventional secondary bonding techniques.

An important aspect of the invention is the selection of a polymer solution which is compatible with the resins and other materials used to create the composite structure. The polymer solution must also be compatible with the electrically conductive material. If the polymer solution is not compatible with the other materials of which the composite is made, from both a chemical and a mechanical perspective, then the conductive fabric will not properly adhere to the remainder of the composite structure resulting in a defective polymer surface. Another advantage of the invention lies in the ability of the user to choose the same material, such as woven glass fibers, for the flexible fabric as is used in making the composite. This aids thermal expansion compatibility for increased reliability over a range of manufacturing and operating temperatures.

These features, as well as others, will become more readily apparent from the following detailed description of the preferred embodiment when taken in conjunction with the illustrative embodiment in the accompanying drawing.

BRIEF DESCRIPTION OF THE DRAWINGS

The figure schematically represents the steps taken to create a roll of a flexible electrically conductive fabric by passing a length of glass fiber fabric through a polymer solution, removing excess polymer solution, curing the polymer solution, applying a metal layer onto the polymerized resin covered fabric, and finally winding the conductive fabric onto a roll for later use.

DETAILED DESCRIPTION OF THE PREFERRED EMBODIMENT

Referring now to the figure, a supply roll 2 of a glass fiber fabric 4, such as that made by Clark-Schwebel Fiberglass Corp. of White Plans, N.Y. and identified as style 108, width 36", pattern 90, finish CS-307, is withdrawn from roll 2 and coated with a polymer solution 6 at polymer solution coating station 8. Polymer solution 6 is used to coat the glass fibers of fabric 4 and to fill in the openings or windows within the fabric. One suitable polymer solution is that sold under the trademark Skybond 705 made by Monsanto of St.Louis, Mo.

Following coating coating station 8, excess polymer solution 6 is removed at an excess polymer removal station 10. This helps to ensure the light weight and flexibility of the end product. Next the coated fabric 13 passes through a polymer curing station 12. Although in the preferred embodiment a thermoplastic polymer solution 6 is used other curable polymer resins, including thermoset and fully polymerized polymer solutions, can be used as well. In any event the coated glass fiber fabric 4 is covered with polymer solution 6 and then cured at station 12 to create a cured polymer coated fabric 14.

The preferred embodiment polymer curing takes place in the drying tower. However, other techniques for curing can be used depending upon the particular polymer solution 6 used, the speed desired and other operating parameters. For example, when fully polymerized polymer solutions are used as polymer solution 6, station 12 could incorporate solvent evaporation apparatus.

Polymer coated fabric 14 then has an electrically conductive material 16 deposited onto the top surface 18 of fabric 14 at a sputtering station 20. Electrically conductive material 16 is preferably a metal element or alloy which creates a very thin electrically conductive surface 22 on top of the upper surface 18 of fabric 14. Because of the cost of the equipment needed to apply electrically conductive materials onto flexible fabrics, this step may be conducted by a company such as the Andus Corporation of Canoga Park, Calif. The polymerized electrically conductive fabric 24 is then loaded onto a roll 26 of the conductive fabric 24 for later use. Such later use typically includes incorporation into a composite structure (including multiple layers of woven glass fabric) or bonding to a surface using conventional secondary bonding techniques. Although fabric 24 finds particular utility in the manufacture of airborne craft, it can be used in other situations, such as electromagnetic shielding of electronic components and so forth.

The present invention has been described in relation to the use of a particular glass fiber fabric 4. However, other fabrics, be they woven fiber, random fiber or unidirectional fiber fabrics can be used as well. In some cases the fabric may have few, if any, holes or windows in the fabric which polymer solution 6 would need to fill. However, polymer solution 6 will still be needed to create a continuous surface upon which to deposit electrically conductive material 16 Polymer coated fabric 14 may be coated with electrically conductive material 16 using techniques other than metal sputtering. For example, vacuum deposition may also be used. Electrically conductive material 16 may be metal such as nickel-chromium alloys, gold, tin, silver and so forth. The material may create either a conductive or semi-conductive surface depending upon the requirements. Although for many applications electrically conductive surface 22 is desired to be uniform in conductivity, it may also be desired to make it non-uniform in a controlled manner. Although the invention shows applying electrically conductive material 16 on only upper surface 18, both surfaces of polymer coated fabric 14 could be coated with electrically conductive material 16 if desired.

In general, to those skilled in the art to which this invention relates, many changes in construction and widely differing embodiments and applications of the present invention will suggest themselves without departing from its spirit and scope. Thus the disclosures and descriptions herein are purely illustrative and are not intended to be in any sense limiting.

What is claimed is:

1. A method for coating the outer surface of a fabric with an electrically conductive film, the fabric of the type having fibers at its outer surface, comprising the following steps:

selecting a polymer solution compatible with the fabric;
   coating the fabric with the polymer solution thereby creating a substantially continuous polymer surface;
   selecting an electrically conductive material compatible with the polymer surface;
   placing the electrically conductive material into a vapor form;
   depositing a continuous film of the vapor form of the electrically conductive material onto the polymer surface to create an electrically conductive fabric;
   controlling the selecting steps, the coating step and the depositing step to keep the fabric in a flexible condition.

2. The method of claim 1 further comprising the step of curing the polymer solution on the fabric after the coating step.

3. The method of claim 1 wherein the coating step is carried out by immersing the fabric into the polymer solution.

4. The method of claim 1 wherein the depositing step is carried out by depositing a metal onto the polymer surface in a partial vacuum.

5. A method for coating the outer surface of a woven glass fiber fabric of the type having a fibrous surface with fibers and holes in the fabric, comprising the following steps:

selecting a polymer solution compatible with the fabric;
   coating the fabric with the polymer solution thereby substantially coating the fibers and substantially filling the holes in the fabric;
   curing the polymer solution on the fabric to create a substantially continuous, cured polymer surface;
   selecting a metal material compatible with the polymer surface;
   placing the metal material into a vapor form;
   depositing the vapor form of the metal material onto the polymer surface in a partial vacuum environment thereby substantially covering the polymer surface with a thin continuous film of the metal material; and
   controlling the selecting steps, the coating step and the depositing step to keep the electrically conductive fabric flexible.

* * * * *